United States Patent
Sullivan

(10) Patent No.: US 10,484,176 B2
(45) Date of Patent: Nov. 19, 2019

(54) MULTIPLY-ENCRYPTING DATA REQUIRING MULTIPLE KEYS FOR DECRYPTION

(71) Applicant: Cloudflare, Inc., San Francisco, CA (US)

(72) Inventor: Nicholas Thomas Sullivan, San Francisco, CA (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

(21) Appl. No.: 15/950,088

(22) Filed: Apr. 10, 2018

(65) Prior Publication Data
US 2019/0116039 A1  Apr. 18, 2019

Related U.S. Application Data

(63) Continuation of application No. 15/585,079, filed on May 2, 2017, now Pat. No. 9,942,044, which is a
(Continued)

(51) Int. Cl.
*H04L 9/32* (2006.01)
*G06F 21/45* (2013.01)
(Continued)

(52) U.S. Cl.
CPC ............ *H04L 9/3226* (2013.01); *G06F 21/31* (2013.01); *G06F 21/40* (2013.01); *G06F 21/45* (2013.01); *G06F 21/60* (2013.01); *G06F 21/62* (2013.01); *G06F 21/6209* (2013.01); *H04L 9/085* (2013.01); *H04L 9/0822* (2013.01);
(Continued)

(58) Field of Classification Search
CPC ............ H04L 9/3226; H04L 63/0478; H04L 63/0435; H04L 63/08; H04L 63/065; H04L 9/0863; H04L 63/104; H04L 63/10; H04L 9/0861; H04L 9/0822; H04L 9/085; H04L 2463/062; G06F 21/45; G06F 21/6209; G06F 21/62; G06F 21/31; G06F 21/60; G06F 21/40; G06F 2221/2147
See application file for complete search history.

(56) References Cited

U.S. PATENT DOCUMENTS

| | | |
|---|---|---|
| 5,787,169 A | 7/1998 | Eldridge et al. |
| 6,360,322 B1 | 3/2002 | Grawrock |

(Continued)

OTHER PUBLICATIONS

Notice of Allowance from U.S. Appl. No. 14/945,089 dated Dec. 22, 2016, 28 pages.
(Continued)

*Primary Examiner* — Darren B Schwartz
(74) *Attorney, Agent, or Firm* — Nicholson De Vos Webster & Elliott LLP

(57) ABSTRACT

A server receives a piece of data for encryption. The server encrypts the piece of data such that no single key can decrypt the encrypted piece of data and any combination of a first multiple of unique keys taken a second multiple at a time are capable of decrypting the encrypted piece of data. Each of the first multiple of unique keys is tied to account credentials of a different user. The second multiple is less than or equal to the first multiple. The encrypted piece of data is returned.

11 Claims, 13 Drawing Sheets

Related U.S. Application Data continuation of application No. 14/945,089, filed on Nov. 18, 2015, now Pat. No. 9,639,687.

(60) Provisional application No. 62/081,529, filed on Nov. 18, 2014.

(51) Int. Cl.
*H04L 29/06* (2006.01)
*H04L 9/08* (2006.01)
*G06F 21/62* (2013.01)
*G06F 21/31* (2013.01)
*G06F 21/60* (2013.01)
*G06F 21/40* (2013.01)

(52) U.S. Cl.
CPC .......... *H04L 9/0861* (2013.01); *H04L 9/0863* (2013.01); *H04L 63/0435* (2013.01); *H04L 63/0478* (2013.01); *H04L 63/065* (2013.01); *H04L 63/08* (2013.01); *H04L 63/10* (2013.01); *H04L 63/104* (2013.01); *G06F 2221/2147* (2013.01); *H04L 2463/062* (2013.01)

(56) References Cited

U.S. PATENT DOCUMENTS

| | | | |
|---|---|---|---|
| 6,363,481 B1* | 3/2002 | Hardjono | H04L 9/085 713/165 |
| 6,530,020 B1 | 3/2003 | Aoki | |
| 6,748,084 B1 | 6/2004 | Gau et al. | |
| 6,823,070 B1* | 11/2004 | Smith | H04L 9/0894 380/28 |
| 6,889,210 B1 | 5/2005 | Vainstein | |
| 7,178,033 B1 | 2/2007 | Garcia | |
| 7,565,702 B2* | 7/2009 | Jakubowski | G06F 21/6209 380/277 |
| 7,802,096 B1 | 9/2010 | Matthews et al. | |
| 8,001,391 B2 | 8/2011 | Zaharris et al. | |
| 8,140,847 B1 | 3/2012 | Wu | |
| 8,160,247 B2* | 4/2012 | Agrawal | G06F 21/10 380/44 |
| 8,447,990 B2* | 5/2013 | Utin | G06F 21/31 705/72 |
| 8,520,855 B1 | 8/2013 | Kohno et al. | |
| 8,538,020 B1* | 9/2013 | Miller | H04L 9/0825 380/255 |
| 9,071,429 B1* | 6/2015 | Roth | H04L 9/0894 |
| 9,087,012 B1* | 7/2015 | Hayes | G06F 11/2094 |
| 9,143,491 B2 | 9/2015 | Kruglick | |
| 9,311,487 B2* | 4/2016 | Unagami | H04L 9/085 |
| 9,461,821 B1* | 10/2016 | Machani | H04L 9/0894 |
| 9,749,132 B1* | 8/2017 | Hamilton | G06F 21/10 |
| 10,027,477 B2* | 7/2018 | Camenisch | H04L 63/0815 |
| 10,146,983 B2* | 12/2018 | Hao | G06K 9/00013 |
| 2001/0055388 A1 | 12/2001 | Kaliski | |
| 2002/0013898 A1* | 1/2002 | Sudia | G06Q 20/02 713/155 |
| 2002/0067832 A1 | 6/2002 | Jablon | |
| 2002/0136410 A1 | 9/2002 | Hanna | |
| 2002/0147906 A1* | 10/2002 | Lotspiech | H04L 12/18 713/158 |
| 2003/0046572 A1 | 3/2003 | Newman et al. | |
| 2003/0081789 A1* | 5/2003 | Numao | H04L 9/085 380/278 |
| 2003/0115477 A1* | 6/2003 | Baldwin | H04L 9/0894 713/193 |
| 2003/0221131 A1 | 11/2003 | Mori et al. | |
| 2004/0025019 A1* | 2/2004 | Watanabe | H04L 9/3013 713/168 |
| 2004/0146164 A1 | 7/2004 | Jonas et al. | |
| 2004/0175000 A1 | 9/2004 | Caronni | |
| 2005/0033963 A1 | 2/2005 | Ronchi et al. | |
| 2005/0097348 A1 | 5/2005 | Jakubowski et al. | |
| 2005/0220300 A1 | 10/2005 | Lipson | |
| 2006/0161791 A1 | 7/2006 | Bennett | |
| 2006/0262933 A1 | 11/2006 | Furukawa et al. | |
| 2007/0050696 A1* | 3/2007 | Piersol | G06F 21/608 715/210 |
| 2007/0140483 A1 | 6/2007 | Jin et al. | |
| 2007/0157032 A1* | 7/2007 | Paganetti | G06F 21/31 713/193 |
| 2008/0095375 A1* | 4/2008 | Tateoka | H04L 9/085 380/282 |
| 2008/0126808 A1 | 5/2008 | Price et al. | |
| 2008/0304661 A1 | 12/2008 | Kato et al. | |
| 2009/0019279 A1 | 1/2009 | Kato | |
| 2009/0106561 A1 | 4/2009 | Ejiri | |
| 2009/0110198 A1 | 4/2009 | Garimella et al. | |
| 2009/0116649 A1* | 5/2009 | Perlman | H04L 9/085 380/277 |
| 2009/0228714 A1 | 9/2009 | Fiske et al. | |
| 2009/0249060 A1 | 10/2009 | Dossett et al. | |
| 2009/0290707 A1 | 11/2009 | Schneider | |
| 2010/0037056 A1* | 2/2010 | Follis | G06F 11/1464 713/171 |
| 2010/0054481 A1* | 3/2010 | Jajodia | H04L 9/085 380/284 |
| 2011/0093939 A1 | 4/2011 | Barbour et al. | |
| 2011/0138191 A1* | 6/2011 | Bond | G06F 21/32 713/189 |
| 2011/0202766 A1 | 8/2011 | Lerner | |
| 2011/0252233 A1 | 10/2011 | De et al. | |
| 2011/0252243 A1 | 10/2011 | Brouwer et al. | |
| 2011/0286595 A1* | 11/2011 | Resch | H04L 9/085 380/46 |
| 2011/0311055 A1* | 12/2011 | Parann-Nissany | G06F 21/602 380/278 |
| 2012/0204026 A1 | 8/2012 | Shi et al. | |
| 2012/0216041 A1* | 8/2012 | Naono | H04L 9/0822 713/171 |
| 2012/0221865 A1 | 8/2012 | Hahn et al. | |
| 2012/0243687 A1* | 9/2012 | Li | H04L 9/085 380/277 |
| 2012/0269348 A1 | 10/2012 | Rong et al. | |
| 2012/0317414 A1 | 12/2012 | Glover | |
| 2013/0010953 A1* | 1/2013 | Seurin | H04L 9/085 380/255 |
| 2013/0010966 A1* | 1/2013 | Li | H04L 9/085 380/278 |
| 2013/0046973 A1* | 2/2013 | Resch | H04L 9/085 713/156 |
| 2013/0080765 A1 | 3/2013 | Mohanty et al. | |
| 2013/0086377 A1* | 4/2013 | Cilfone | H04L 9/085 713/156 |
| 2013/0212393 A1 | 8/2013 | D'Souza | |
| 2013/0227139 A1* | 8/2013 | Suffling | H04L 9/3236 709/225 |
| 2013/0254537 A1 | 9/2013 | Bogorad | |
| 2013/0318347 A1 | 11/2013 | Moffat | |
| 2014/0006806 A1* | 1/2014 | Corella | G06F 21/6218 713/193 |
| 2014/0201533 A1* | 7/2014 | Kruglick | H04L 63/062 713/171 |
| 2014/0281574 A1 | 9/2014 | Webb | |
| 2014/0307869 A1 | 10/2014 | Krummel et al. | |
| 2015/0312260 A1 | 10/2015 | Kim et al. | |
| 2015/0312759 A1* | 10/2015 | Kim | G06F 21/10 455/411 |
| 2015/0378842 A1 | 12/2015 | Tomlinson et al. | |
| 2016/0014110 A1 | 1/2016 | Kurspahic | |

OTHER PUBLICATIONS

Notice of Allowance from U.S. Appl. No. 15/585,079, dated Dec. 4, 2017, 18 pages.

* cited by examiner ental Application No. No. 15/585,079, filed May 2, 2017, which is a continuation of U.S. application Ser. No. 14/945,089, filed Nov. 18, 2015, which claims the benefit of U.S. Provisional Application No. 62/081,529, filed Nov. 18, 2014, which is hereby incorporated by reference.

MULTIPLY-ENCRYPTING DATA REQUIRING MULTIPLE KEYS FOR DECRYPTION

CROSS-REFERENCE TO RELATED APPLICATIONS

This application is a continuation of U.S. application Ser. No. 15/585,079, filed May 2, 2017, which is a continuation of U.S. application Ser. No. 14/945,089, filed Nov. 18, 2015, which claims the benefit of U.S. Provisional Application No. 62/081,529, filed Nov. 18, 2014, which is hereby incorporated by reference.

FIELD

Embodiments of the invention relate to the field of computer security; and more specifically to multiply-encrypting data in such a way that multiple keys are required to decrypt the data.

BACKGROUND

It is common to encrypt data to provide security for the data. In symmetric key encryption, the plaintext (the data to be encrypted) is encrypted with a key (generating ciphertext) and that same key is capable of decrypting the data. In asymmetric encryption (e.g., public key encryption), the encryption key is public (e.g., published for anyone to use and encrypt messages) and the decryption key is private. Thus, while anyone can encrypt the data using the public key, only the intended recipient can decrypt the data using the private decryption key. Most encryption techniques require knowledge of a single key in order to decrypt the encrypted data.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
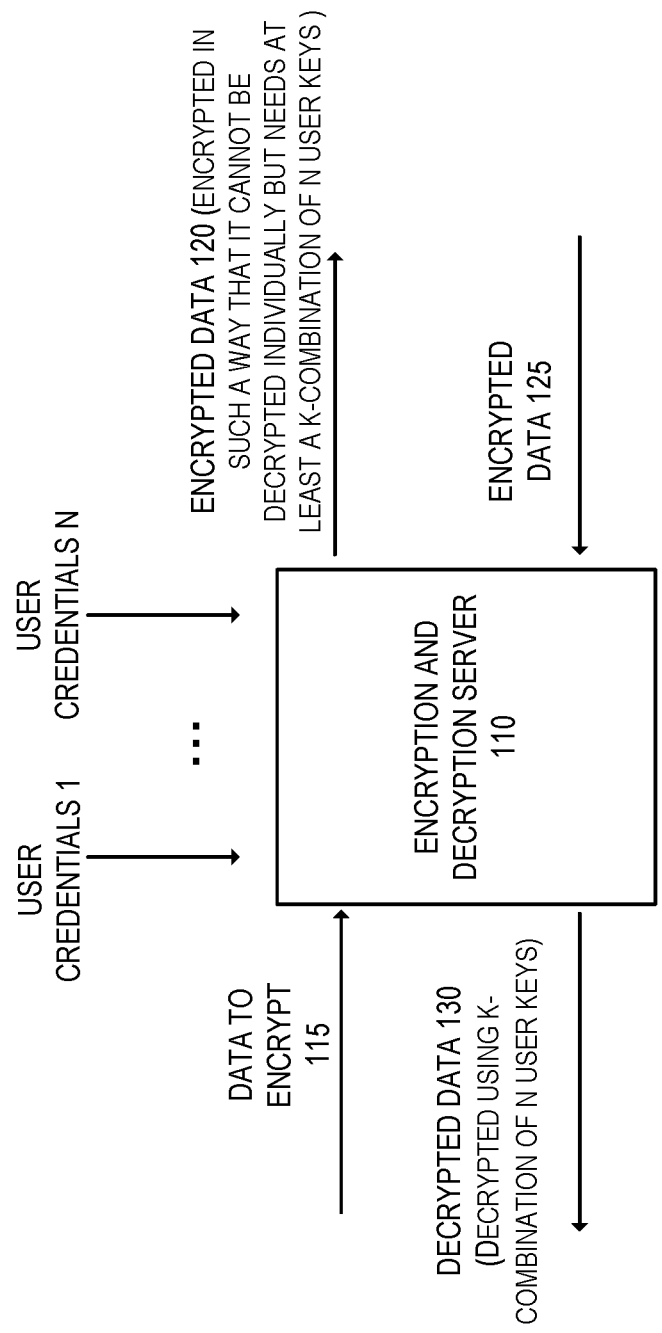
FIG. 1 illustrates an exemplary system for encrypting data in such a way that no single key can decrypt the encrypted data and any K-combination of N unique keys (where N is greater than 1 and K is less than or equal to N) are capable of decrypting the encrypted piece of data according to one embodiment.

A method and apparatus for multiply-encrypting data requiring multiple keys for decryption is described herein. In one embodiment, a piece of data is encrypted such that no single key can decrypt the encrypted piece of data and any combination of unique keys at a time are capable of decrypting the encrypted piece of data. FIG. 1 illustrates an exemplary system for encrypting data in such a way that no single key can decrypt the encrypted data and any K-combination of N unique keys (where N is greater than 1 and K is less than or equal to N) are capable of decrypting the encrypted piece of data according to one embodiment. To say it another way, no single key can decrypt the encrypted data and any combination of N unique keys taken K at a time are capable of decrypting the encrypted piece of data. In one embodiment, each one of the N unique keys is tied to account credentials of a different user. For example, each unique key maybe a user key that is specific to a particular user and generated from account credentials of that user. Thus, different users have different user keys. The values of K and N may be specified when encrypting the data. By way of example, the piece of data may be encrypted using such that there are 3 unique keys (unique keys 1, 2, and 3) and any combination of 2 of those 3 unique keys are necessary to decrypt the data (e.g., a combination of the unique keys 1 and 2, a combination of the unique keys 1 and 3, or the combination of the unique keys 2 and 3).

Figure 4:
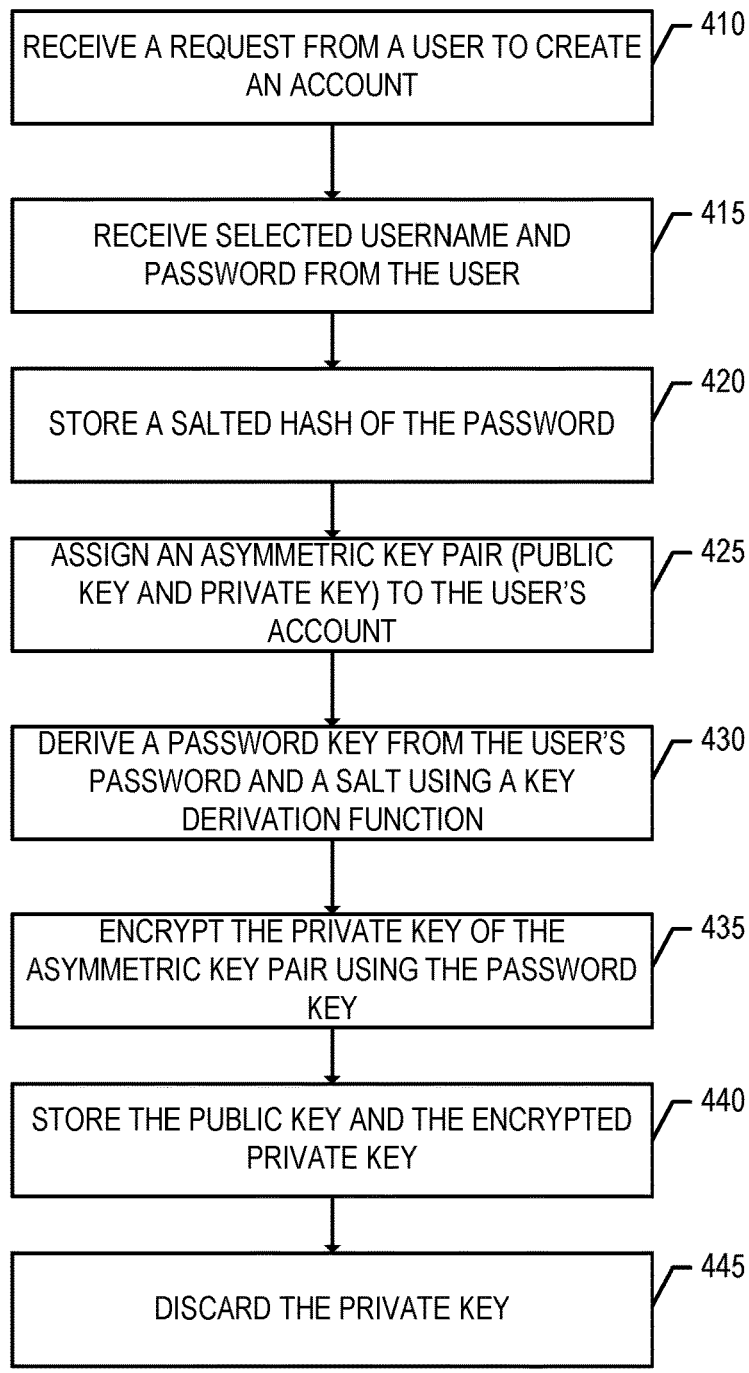
FIG. 4 is a flow diagram that illustrates exemplary operations performed when creating an account according to one embodiment.

The encryption and decryption server 110 receives data 115 to encrypt and encrypts the data 115 in such a way that it cannot be decrypted by any single decryption key, but needs at least a K-combination of N user keys for decryption. Each user key is specific to a particular user. For example, each user key is generated based on the respective user credentials of the users. Thus, for example, the data 115 is encrypted using the user credentials 1-N for users 1-N respectively (e.g., the username/password of users 1-N). For example, for each of the users N, the encryption and decryption server 110 creates a key pair (e.g., an RSA public and private key) and encrypts the private key with a key derived from the user credentials (e.g., the password) and optionally with a randomly generated salt using a secure key derivation function. One embodiment of generating the user key will be described with reference to FIG. 4.

The data 115 may be received as part of a request to encrypt the data. The request and the data may be received over a network communication (e.g., over a TLS connection). The request may specify the list of N users that are authorized to participate in the decryption and indicate the minimum number of unique user keys of the N users that is needed to decrypt the data. For example, a request to encrypt data may specify that any combination of 2 of 3 user keys of users 1, 2, and 3 are necessary to decrypt the data. In one embodiment, when encrypting the data 115, the encryption and decryption server 110 generates a random or pseudo-random symmetric key (e.g., an AES key) for encrypting the payload, which is referred herein as the "data key". For each user that is allowed to participate in the decryption of the data, a user-specific key encryption key is generated, which is referred herein as the "data key encryption key". For example, if users 1, 2, and 3 are authorized to participate in the decryption, a unique data key encryption key (data KEK) for users 1, 2, and 3 is respectively generated. For each unique K combination of users, the data key is encrypted using each of the data key encryption keys of the users of that combination. Each data key encryption key is encrypted with the respective public key of the user. The encrypted data 120, the set of multiply-encrypted data keys, and the encrypted data key encryption keys, may be bundled and returned to the requester. The encrypted data 120, the set of multiply-encrypted data keys, and/or the encrypted data key encryption keys may also be stored on the encryption and decryption server 110 or elsewhere. A specific embodiment for encrypting the data will be described later herein.

The encryption and decryption server 110 receives encrypted data 125 that has been encrypted in such a way that it cannot be decrypted by any single decryption key, but needs at least a K-combination of N user keys for decryption. The encrypted data 125 may be received as a request to decrypt the data and the request may also include metadata that allows the data to be decrypted assuming the appropriate user credentials are provided or are available. For example, the request may include the set of multiply-encrypted data keys and the encrypted data key encryption keys. The request may also include the list of users that are authorized to participate in the decryption and the minimum number of unique user keys needed for decryption.

The encryption and decryption server 110 may validate that the request for decryption is being received from a user that is authorized to decrypt the requested data. For example, the encryption and decryption server 110 may determine whether access credentials presented by the requesting user is valid and/or whether the requesting user is an administrator or otherwise authorized to decrypt the requested data. The encryption and decryption server 110 may validate whether the request for decryption can be fulfilled. For example, the encryption and decryption server 110 may determine whether there is a sufficient number of user keys (e.g., private keys of the valid users) available for decryption. If there is not a sufficient number (e.g., less than the minimum number needed for decryption), the encryption and decryption server 110 may take alternative actions such as denying the decryption request and/or notifying or requesting those users that have not provided credentials that there is a pending decryption request. Assuming that the decryption request can be fulfilled, the encryption and decryption server 110 decrypts the data 130. For example, the encryption and decryption server 110 determines the combination of users and their respective keys to use for decryption and uses the user keys of those users to decrypt the appropriate data key encryption keys. Consider the example where users 1, 2, and 3 are authorized to participate in the decryption and at least two of the three corresponding user keys must be used in order to decrypt the data. If the private keys for the users 1 and 3 are available, the encryption and decryption server 110 uses those user keys to decrypt the data key encryption keys generated for users 1 and 3 respectively. These data key encryption keys are then used to decrypt the multiply-encrypted data key to produce the data key. The data key is then used to decrypt the data.

The user keys of the users may be provided to the encryption and decryption server 110 in different ways in different embodiments. In one embodiment, a user can delegate permission for their user key to be used by the encryption and decryption server 110 during encryption and/or decryption. The delegation of a user key may be limited for a certain length of time and/or a certain number of users. For example, in one embodiment when submitting a delegation authorization to the encryption and decryption server 110, the user supplies access credentials (e.g., username and password) and the encryption and decryption server 110 verifies that the access credentials are correct. If they are correct, a key is derived that is used to decrypt their user key that is then available for the encryption and decryption server 110 to use. In another embodiment, the user transmits their user key to the encryption and decryption server 110 (e.g., over TLS or otherwise encrypted connection) along with the delegation authorization. In one embodiment, upon receiving a decryption request, the encryption and decryption server 110 may request the users that are authorized to participate in the decryption to provide their user key or delegate permission to use their user key to the encryption and decryption server 110.

Figure 2:
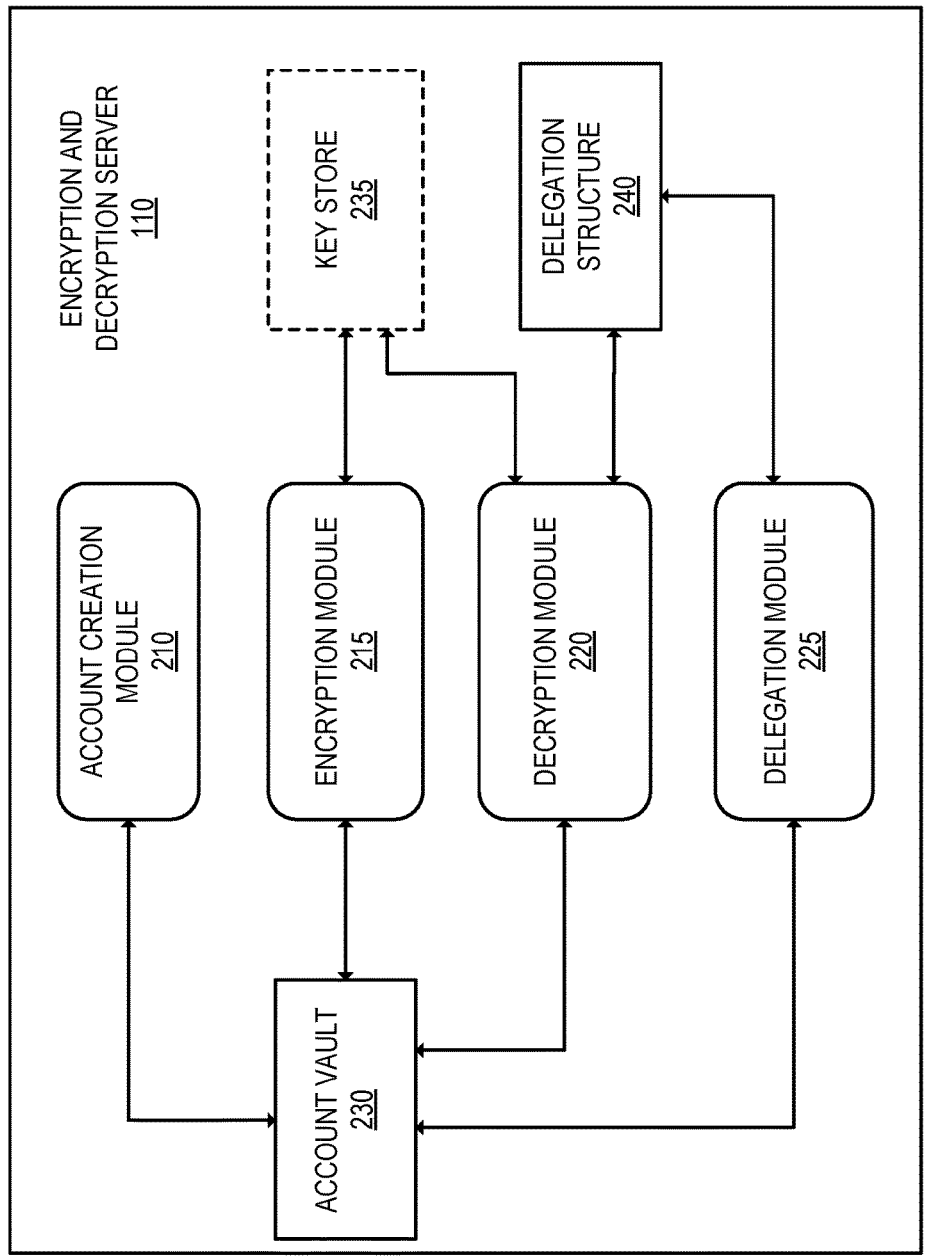
FIG. 2 illustrates more detail of the encryption and decryption server illustrated in FIG. 1 according to one embodiment.
Figure 3:
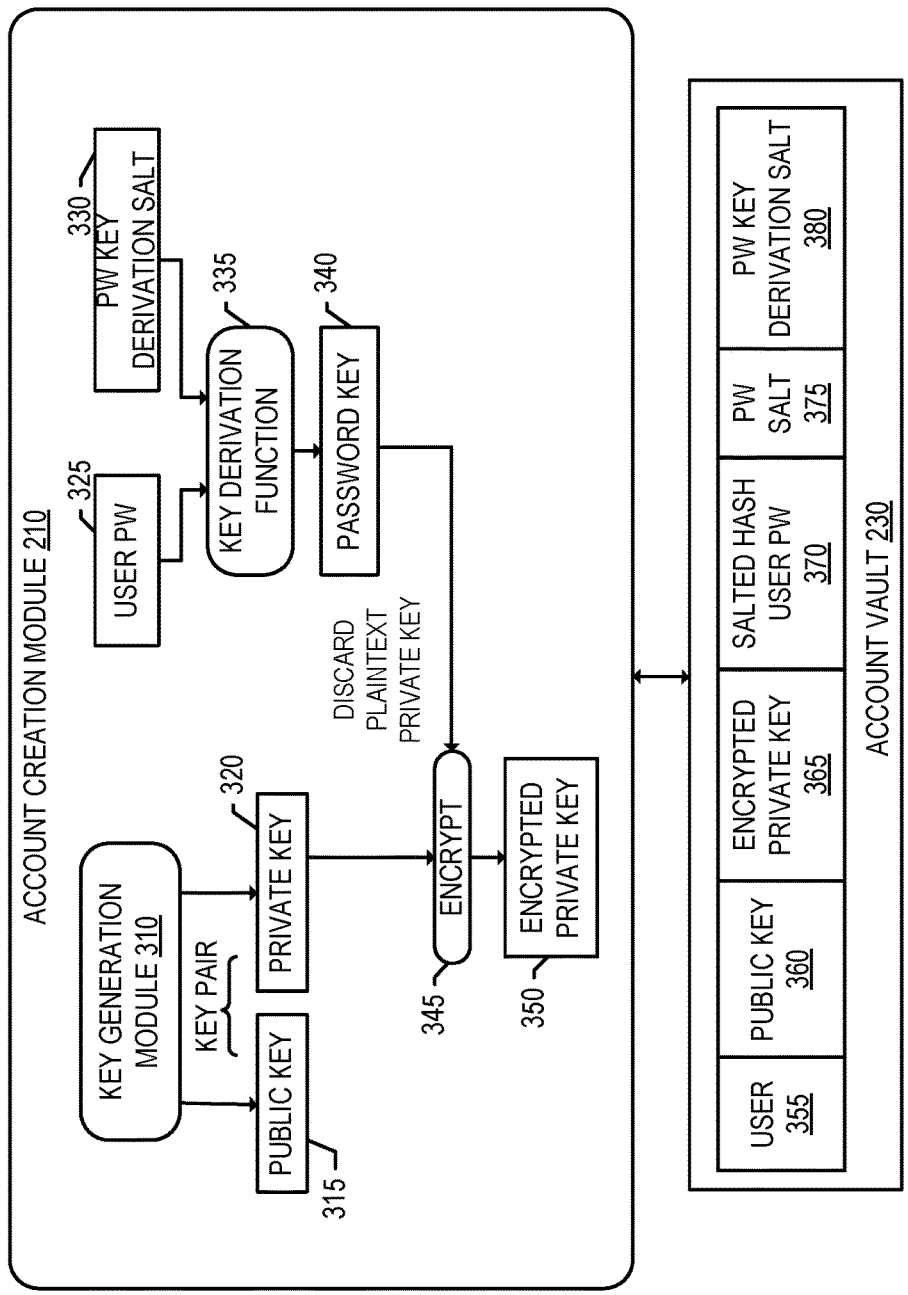
FIG. 3 illustrates more detail of the account creation module illustrated in FIG. 2 according to one embodiment.

FIG. 2 illustrates more detail of the encryption and decryption encryption and decryption server 110 according to one embodiment. While certain details of the encryption and decryption server 110 are illustrated in FIG. 2, it should be understood that other embodiments may have different, fewer, or additional details. The encryption and decryption encryption and decryption server 110 includes the account creation module 210 that is described in more detail with reference to FIG. 3. The account creation module 210 creates accounts for users of the encryption and decryption server 110 including creating a user key for the user. FIG. 3 will be described with reference to the exemplary operations of FIG. 4. It should be understood that the operations described with reference to FIG. 4 can be performed by embodiments different than those described with reference to FIG. 3, and the embodiments described with reference to FIG. 3 can perform operations different than those described with reference to FIG. 4.

At operation 410, the account creation module 210 receives a request from a user to create an account. This request may be received from a user along with a potential username and password from the user. Flow then moves to operation 415 and the account creation module 210 receives the selected username and user password 325 from the user. Alternatively, account creation module 210 may assign a user password for the user. Flow then moves to operation 420 and the account creation module 210 generates a salted hash of the user password. The account creation module 210 may use any number of hash algorithms such as SHA-1 when generating the salted hash. Flow then moves to operation 425 and the account creation module 210 assigns an asymmetric key pair (public key and private key) to the user's account. For example, the key generation module 310 generates a random public key 315 and private key 320 (a key pair) for the account. Any suitable asymmetric encryption algorithm may be used for creating the key pair such as RSA. In an alternative embodiment, the account creation module 210 assigns a symmetric key to the user's account.

Flow moves from operation 425 to operation 430 and the account creation module 210 derives a password key from the user's password and a salt using a key derivation function. For example, the account creation module 210 uses the key derivation function 335 that takes as input the user password 325 and the password key derivation salt 330 to produce the password key 340. The key derivation function 335 may be, for example, the scrypt key derivation function described in IETF draft "draft-josefsson-scrypt-kdf-01", Sep. 24, 2014, by Percival et al.

Flow then moves to operation 435 and the account creation module 210 encrypts the private key of the asymmetric key pair of the user (the private key 320) with the derived password key 340. With reference to FIG. 3, the account creation module 210 encrypts 345 the private key 320 using the password key 340 to generate the encrypted private key 350. At operation 440, the public key (unencrypted) and the encrypted private key are stored in the account vault 230. Then, at operation 445, the plaintext private key (unencrypted form of the private key) is discarded. Thus, the encryption and decryption server 110 does not store the unencrypted private key. Alternatively if the key generation module 310 generates a symmetric key, that symmetric key is encrypted using the password key 340 and the encrypted symmetric key is stored in the account vault 230 (the plaintext symmetric key is discarded).

A number of data items are stored in association with the user identifier in the account vault 230. For example, the user field 355 stores the user identifier, the public key field 360 stores the public key generated by the key generation module 310 for the user, the encrypted private key field 365 stores the encrypted private key 350, the salted hash user password field 370 stores the salted hash of the user password, the password salt field 375 stores the salt used when salting the hash of the user password, and the password key derivation salt field 380 stores the password key derivation salt 330. Alternatively in the case of symmetric encryption, the public key and the encrypted private key may not be stored in the account vault 230 and a field for storing the encrypted symmetric key may be stored in the account vault 230.

Figure 5:
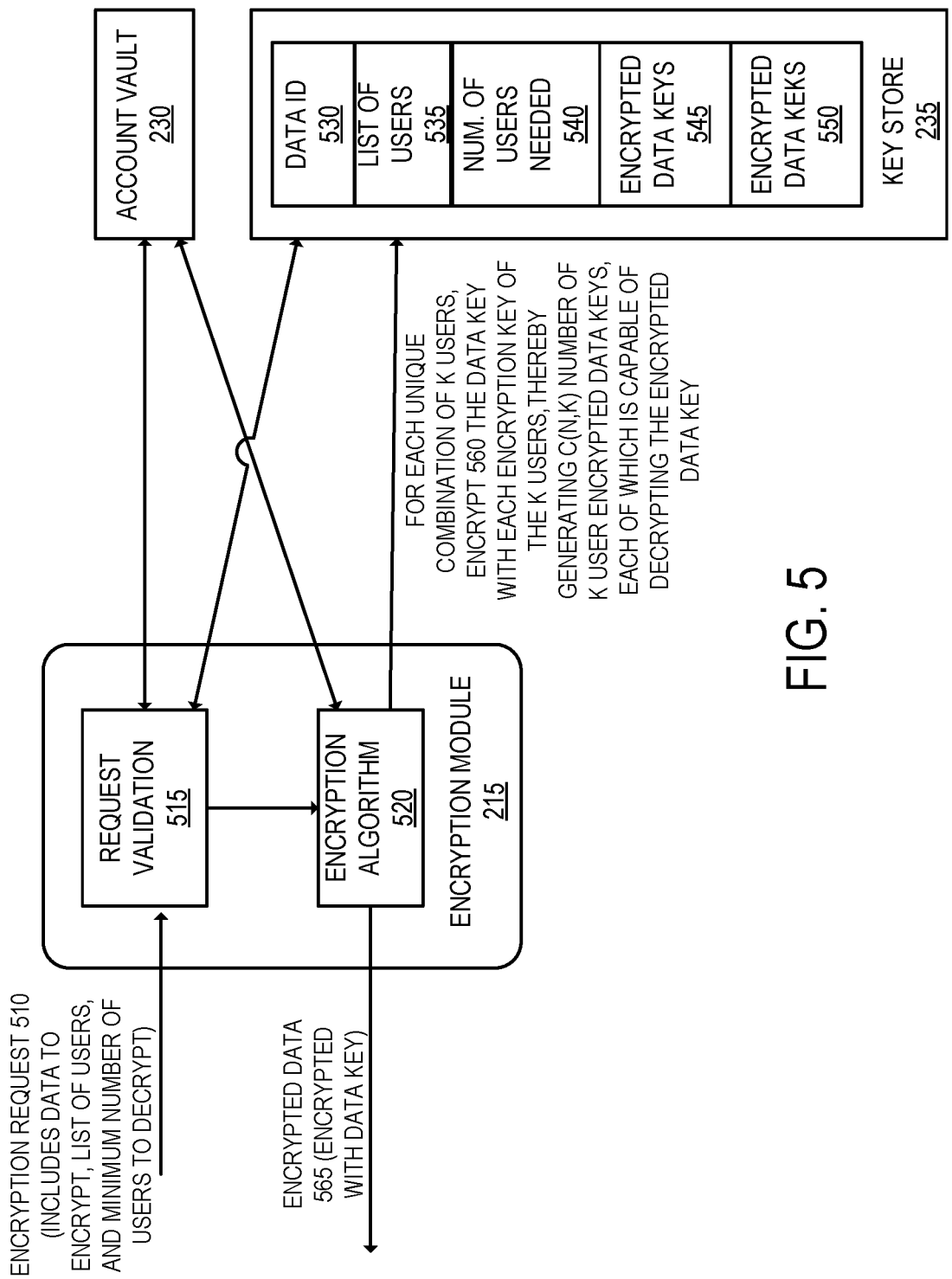
FIG. 5 illustrates more detail of the encryption module illustrated in FIG. 2 according to one embodiment.

The encryption and decryption server 110 also includes the encryption module 215 that is described in more detail with reference to FIGS. 5-7. The encryption module 215 encrypts the data such that no individual key can decrypt the data but instead at least a K-combination of N user keys is required for decryption. FIG. 5 will be described with reference to the exemplary operations of FIG. 6. It should be understood that the operations described with reference to FIG. 6 can be performed by embodiments different than those described with reference to FIG. 5, and the embodiments described with reference to FIG. 5 can perform operations different than those described with reference to FIG. 6.

The encryption module 215 receives an encryption request 510 and the request validation module 515 validates whether the request is valid. The encryption request 510 may include the data to encrypt, a list of users, and the minimum number of users that will be required to provide their user credentials for decrypting the data. The request validation module 515 validates the request such as determining if each of the listed users has an account with the server, for example. As another example, the request validation module 515 may determine whether the user submitting the request is authorized to encrypt data (e.g., determine whether access credentials presented by the requesting user are valid and/or whether the requesting user is an administrator or otherwise authorized to encrypt the data). With reference to FIG. 6, at operation 610, the encryption module 215 receives a request to encrypt a piece of data, the request indicating a list of users that are authorized to participate in the decryption, a minimum number of users that are required to provide user credentials to decrypt that piece of data, and the data itself.

After validating that the request is valid, the encryption module 215 uses the encryption algorithm 520 to encrypt the data according to the parameters set forth in the request. The encryption algorithm 520 encrypts the data such that no single key can decrypt the encrypted piece of data and any combination of unique user keys taken at a time are capable of decrypting the encrypted piece of data. For example, if users 1, 2, and 3 are authorized to participate in the decryption and there must be at least 2 user keys available, the data is encrypted such that no single user key 1, 2, or 3 can decrypt the encrypted data, but any combination of at least two of the user keys 1, 2, or 3 (e.g., user keys 1 and 2, user keys 1 and 3, or user keys 2 and 3) are capable of decrypting the encrypted piece of data. By way of example, the encryption module 215 uses the encryption algorithm 520 to generate a data key to encrypt the data and, for each unique combination of K users, encrypt 560 the data key with each encryption key of the K users thereby generating C(N, K) number of K user encrypted data keys, each of which is capable of decrypting the encrypted data key. Using the example above, a data key is generated and the encryption and decryption server 110 encrypts the data and encrypts the data key three separate times to generate three encrypted data keys for the three different combinations. The encrypted data 565 may be returned to the requester along with metadata to decrypt the encrypted data.

Figure 6:
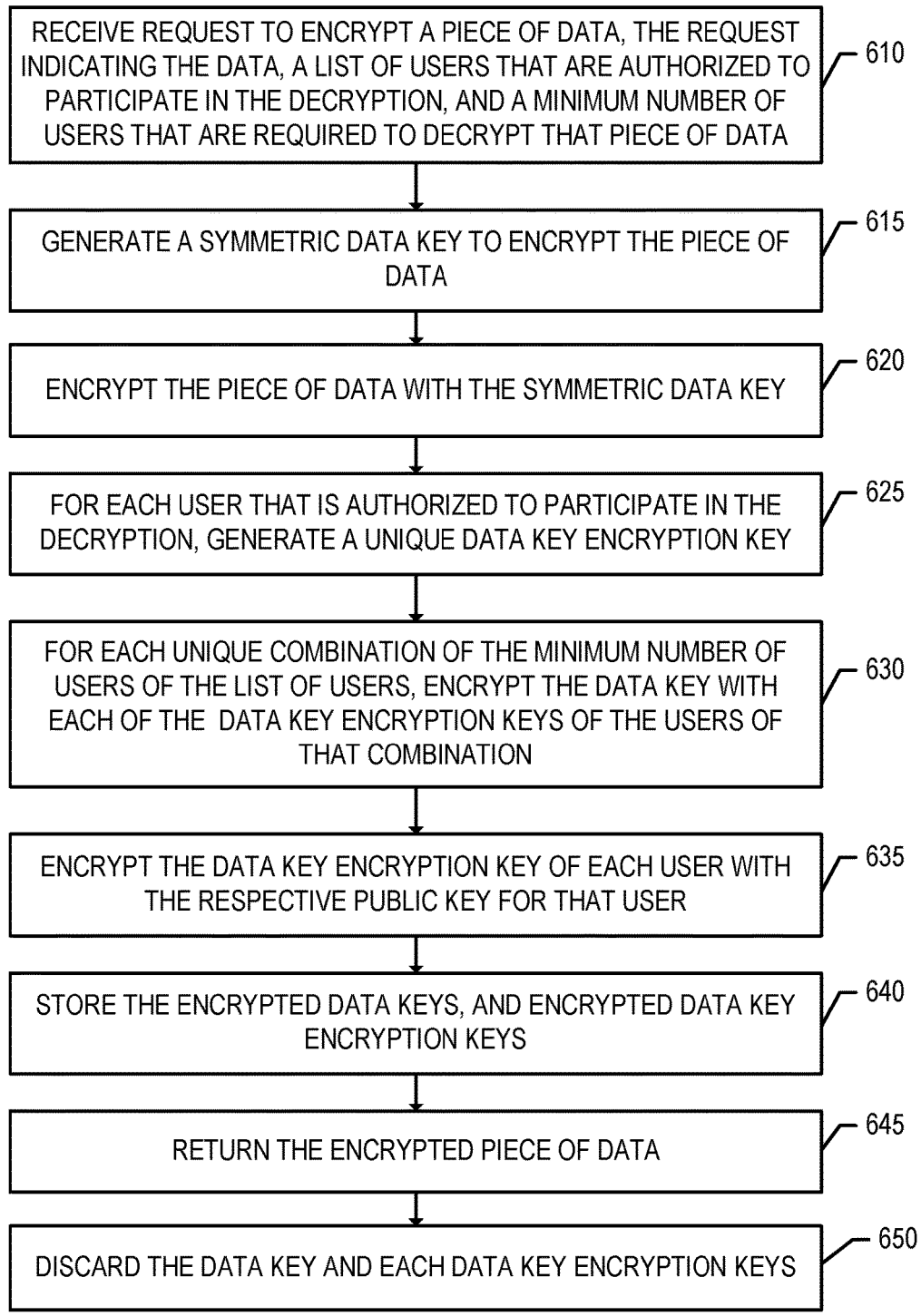
FIG. 6 is a flow diagram that illustrates exemplary operations for encrypting data in accordance with some embodiments.

With reference to FIG. 6, at operation 615, a symmetric data key is generated to encrypt the piece of data. The generated data key is a random or pseudorandom symmetric key (e.g., an AES key) according to one embodiment. Next, at operation 620, the data is encrypted using the generated symmetric data key. Flow then moves to operation 625 where, for each user that is authorized to participate in the decryption (as specified in the request to encrypt the piece of data and potentially the user requesting the encryption), a unique data key encryption key is generated. Thus, if there are three users that are authorized to participate in the decryption, three unique data key encryption keys are generated. The unique data key encryption key may be a random or pseudorandom symmetric key (e.g., an AES key) according to one embodiment.

Next, at operation 630, for each unique combination of the minimum number of users of the list of users, the data key is encrypted with each of the data key encryption keys of the users of that combination. As an example where there are three users and the minimum number of user keys required for decryption is two (that is, any combination of two of the three user keys is required for decryption), there are three unique combinations of the minimum number of user keys (e.g., user key 1 and user key 2; user key 1 and user key 3; and user key 2 and user key 3) and the data key is encrypted with each of the data key encryption keys of the users of that combination. Thus, for the combination of user keys 1 and 2, the data key is encrypted with the data key encryption key of user 1 and the data key encryption key of user 2; for the combination of user keys 1 and 3, the data key is encrypted with the data key encryption key of user 1 and the data key encryption key of user 3; and for the combination of user keys 2 and 3, the data key is encrypted with the data key encryption key of user 2 and the data key encryption key of user 3. Flow then moves to operation 635.

At operation 635, the data key encryption key of each of the users authorized to participate in the decryption is encrypted with the respective public key of that user. Thus, the data key encryption key generated for user 1 is encrypted with the public key of user 1 and so on. Flow then moves to operation 640 where the encrypted data keys and the encrypted data key encryption keys are stored. For example, with reference to FIG. 5, the encryption module 215 is coupled with the key store 235 that includes a data identifier field 530 that stores an identifier of the data being encrypted, a list of users field 535 that stores the list of users that are authorized to participate in the decryption, a number of users needed field 540 that stores the number of users that are required for decryption; an encrypted data keys field 545 that stores the encrypted data keys for each unique combination; and the encrypted data key encryption key field 550 that stores the encrypted data key encryption keys. In one embodiment, the key store 235 is not stored on the encryption and decryption server 110 but is instead returned with the encrypted data as metadata and sent to the encryption and decryption server 110 along with a request to decrypt the data. In another embodiment, the key store 235 is included on the encryption and decryption server 110 and the file to decrypt and the key store 235 share an identifier (e.g., a hash of the file to decrypt). Flow moves from operation 640 to operation 645.

At operation 645, the encrypted piece of data is returned to the requester. In addition, in some embodiments, the key store for the encrypted piece of data is also returned to the requester. Flow then moves to operation 650 where the data key is discarded from the encryption and decryption server 110. The data key encryption keys may also be discarded from the encryption and decryption server 110.

Figure 7:
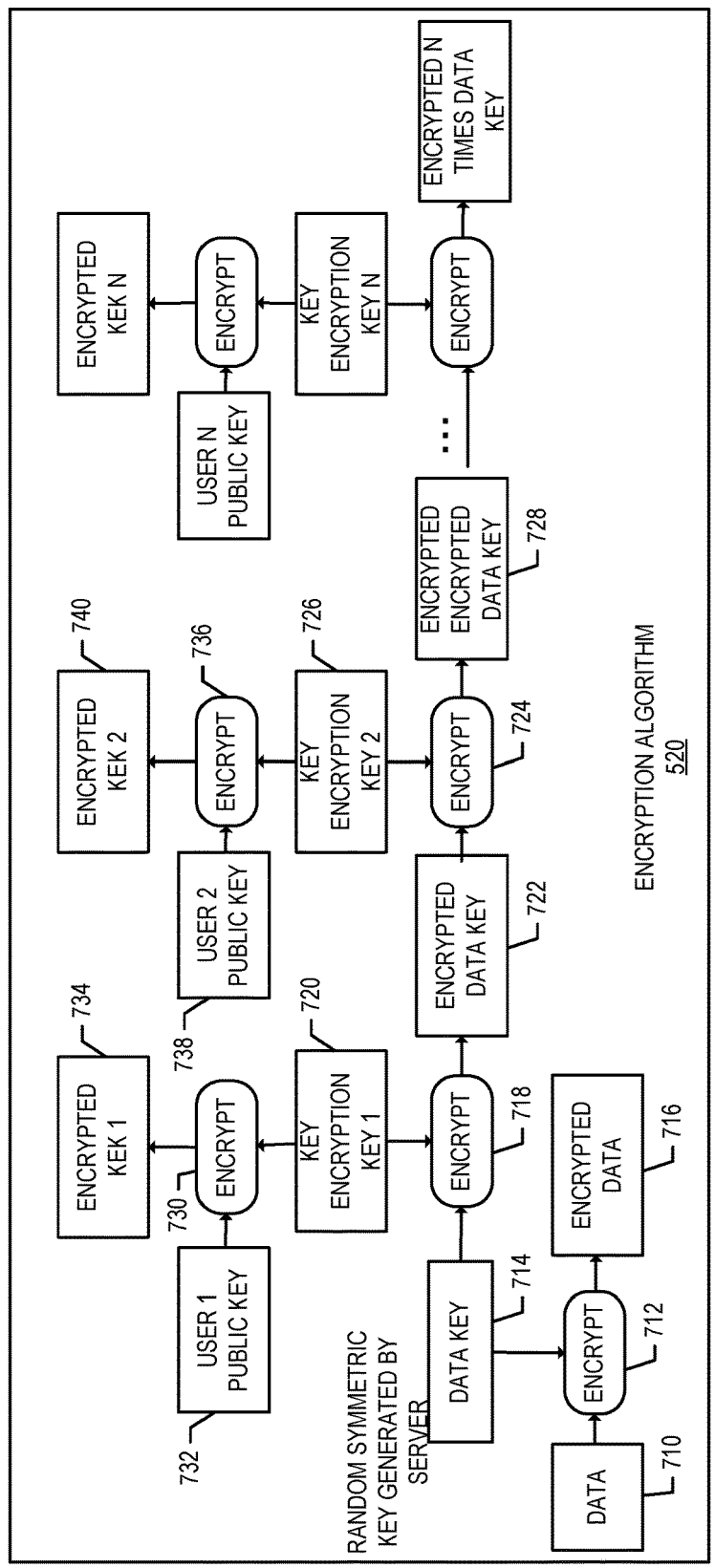
FIG. 7 illustrates an exemplary encryption algorithm for encrypting data in accordance with some embodiments.

A specific example of the encryption algorithm 520 is shown in FIG. 7. The data key 714 (a random or pseudorandom symmetric key generated by the encryption and decryption server 110) is used to encrypt 712 the piece of data 710 thereby generating the encrypted data 716. The data key encryption key (KEK) for user 1 720 (a random or pseudorandom symmetric key generated by the encryption and decryption server 110) is used to encrypt 718 the data key 714 thereby generating the encrypted data key 722. The data KEK for user 2 726 is used to encrypt 724 the encrypted data key 722 thereby generating the doubly-encrypted data key 728. The doubly-encrypted data key 728 may be encrypted an additional N number of times following the same pattern according to the minimum number of users required to decrypt the data. For example, if the minimum number of users is 3, the data key will be encrypted with all three of the data KEKs for the users. In addition to encrypting the data key, the KEKs of the users are also encrypted. The public key of user 1 732 is used to encrypt 730 the data KEK for user 1 720 thereby generating the encrypted KEK for user 1 734. Similarly, the public key of user 2 738 is used to encrypt 736 the data KEK for user 2 726 thereby generating the encrypted KEK for user 2 740.

Figure 8:
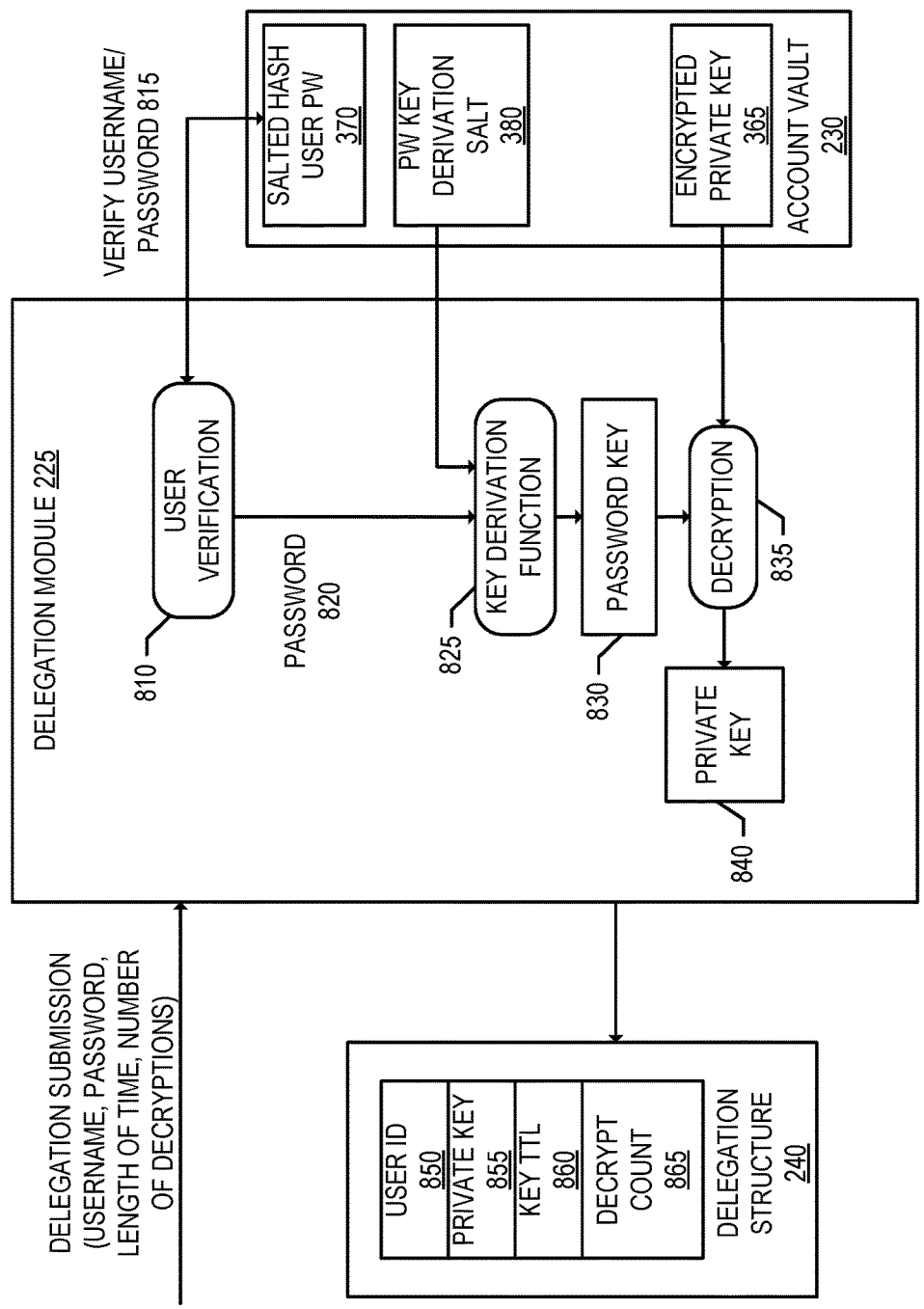
FIG. 8 illustrates more detail of the delegation module illustrated in FIG. 2 according to one embodiment.
Figure 9:
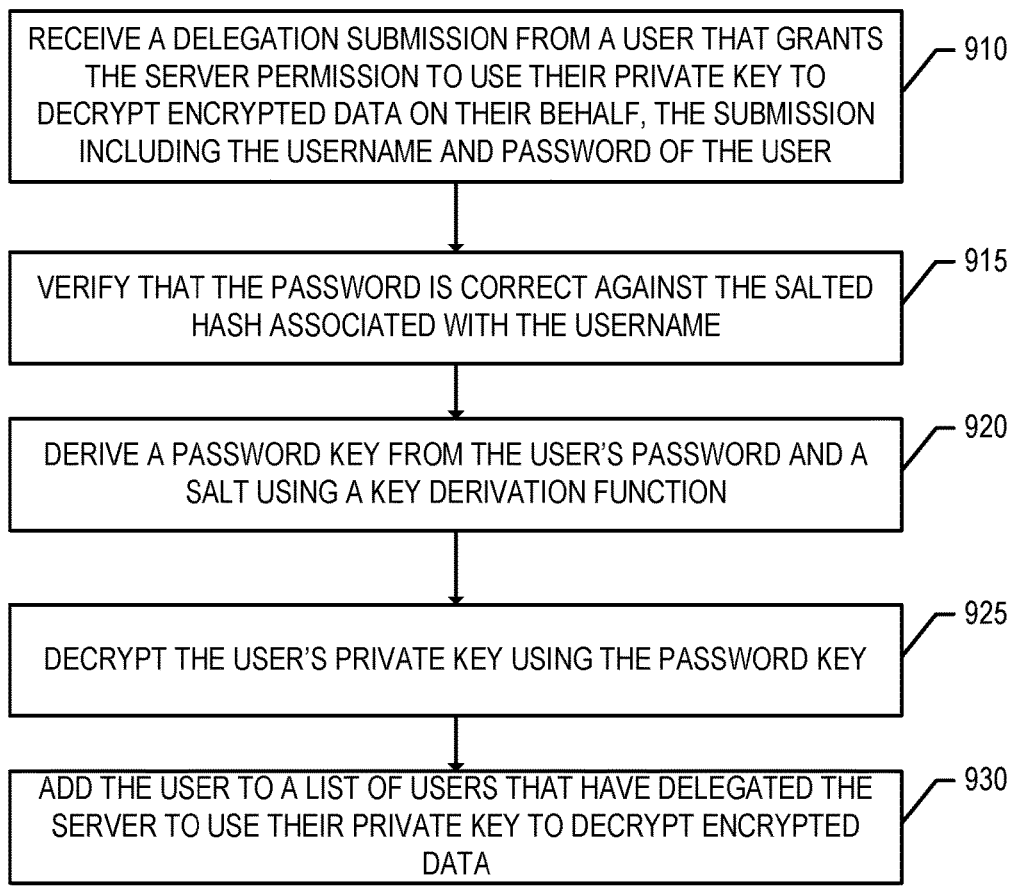
FIG. 9 is a flow diagram that illustrates exemplary operations for delegating credentials according to one embodiment.

In one embodiment, authorized users can delegate their credentials to the encryption and decryption server 110 for a certain period of time and/or a limited number of users. In such an embodiment, the encryption and decryption server 110 can decrypt any previously encrypted payloads as long as the appropriate number of users have delegated credentials on the encryption and decryption server 110. The encryption and decryption server 110 includes the delegation module 225, which will be described in greater detail with respect to FIGS. 8 and 9. FIG. 9 is a flow diagram that illustrates exemplary operations for delegating credentials according to one embodiment. The operations of FIG. 9 may be performed by the delegation module 225 of the encryption and decryption server 110 in some embodiments.

At operation 910, the delegation module 225 receives a delegation submission from a user that grants the encryption and decryption server 110 permission to use their private key to decrypt encrypted data on their behalf. The submission includes the username and password of the user. The delegation submission may be received from the user over a TLS connection or otherwise encrypted. The delegation submission may also include a limit to the length of time authorized for the delegation and/or a limited number of times the credentials may be used.

Next, at operation 915, the delegation module 225 verifies that the password is correct against the salted hash associated with the username. For example, the user verification module 810 hashes the user password (using the same hash function as when generating the salted hash of the user password) using the same salt value and compares the result with the salted hash of the user password stored in the account vault 230. If the salted hash values do not match, then the password is determined to not be correct and the user may be notified. If the salted hash values match, then the password provided is correct for the user. Flow then moves to operation 920.

At operation 920, the delegation module 225 derives a password key from the user's password and a salt using a key derivation function. For example, the delegation module 225 uses the key derivation function 825, which takes as input the user password 820 (submitted in the delegation submission and verified as being correct), and the password key derivation salt stored in the password key derivation salt field 380 for the user. The key derivation function 825 may be, for example, the scrypt key derivation function. The result is the password key 830. Flow moves from operation 920 to operation 925.

At operation 925, the delegation module 225 decrypts the user's private key using the generated password key. For example, the delegation module 225 accesses the encrypted private key of the user from the encrypted private key field 365 of the account vault 230 and decrypts the encrypted private key using the decryption function 835 and the password key 830 to reveal the private key 840. Flow then moves to operation 930 where the user is added to a list of users that have delegated the server to use their private key to decrypt encrypted data. The list of users may be stored in the delegation structure 240, which includes data related to the delegation for each user and includes the user identifier field 850 that stores an identifier of the user (e.g., the username), the private key field 855 that stores the private key of the user, the key time-to-live (TTL) field 860 that stores the length of time that the delegation is valid, and the decrypt count field 865 that stores the number of times the private key can be used by the server until the delegation ends.

The encryption and decryption server 110 also includes the decryption module 220 that decrypts data according to embodiments described herein. To decrypt data, the encryption and decryption server 110 validates that the requesting user has the correct password and checks whether a minimum number of users have delegated their credentials before proceeding with decryption. If the minimum number of users has delegated their credentials, then the private key of each of those respective users is used to decrypt the data key encryption key for that user. These data key encryption keys are then used to decrypt the multiple-encrypted data key, which is then used to decrypt the data.

Figure 10:
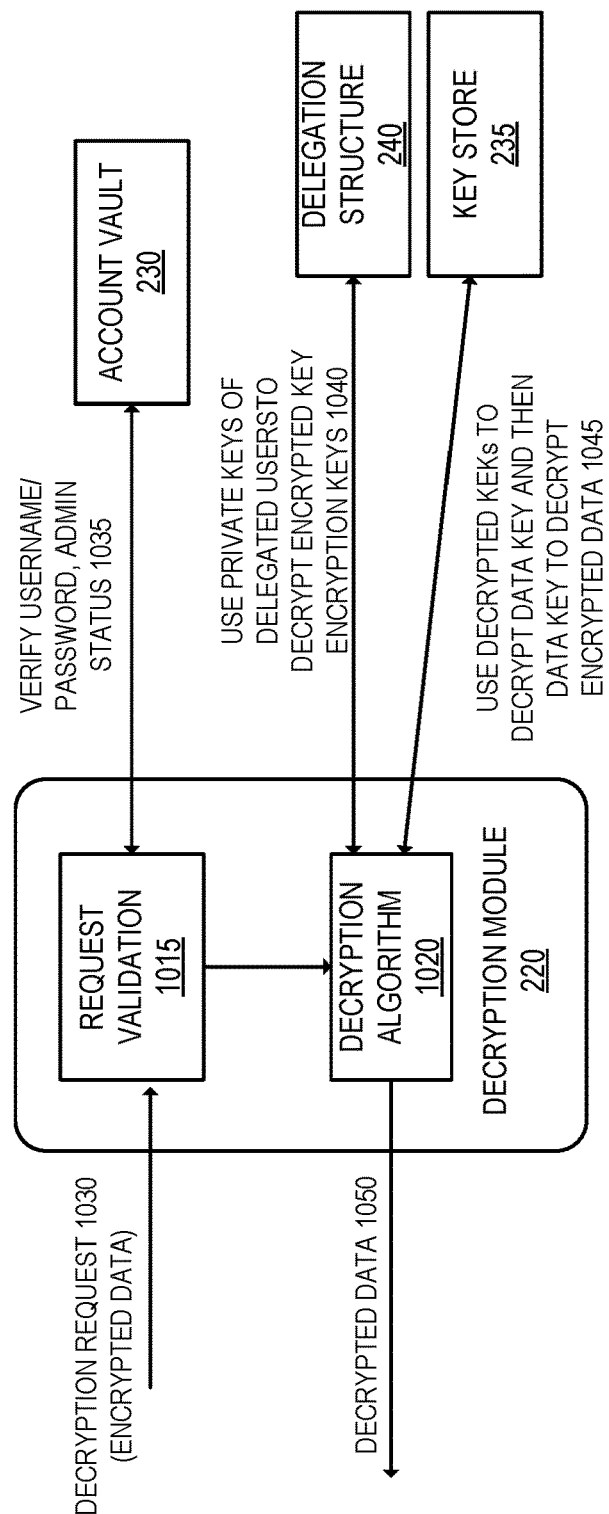
FIG. 10 illustrates more detail of the decryption module illustrated in FIG. 2 according to one embodiment.
Figure 11:
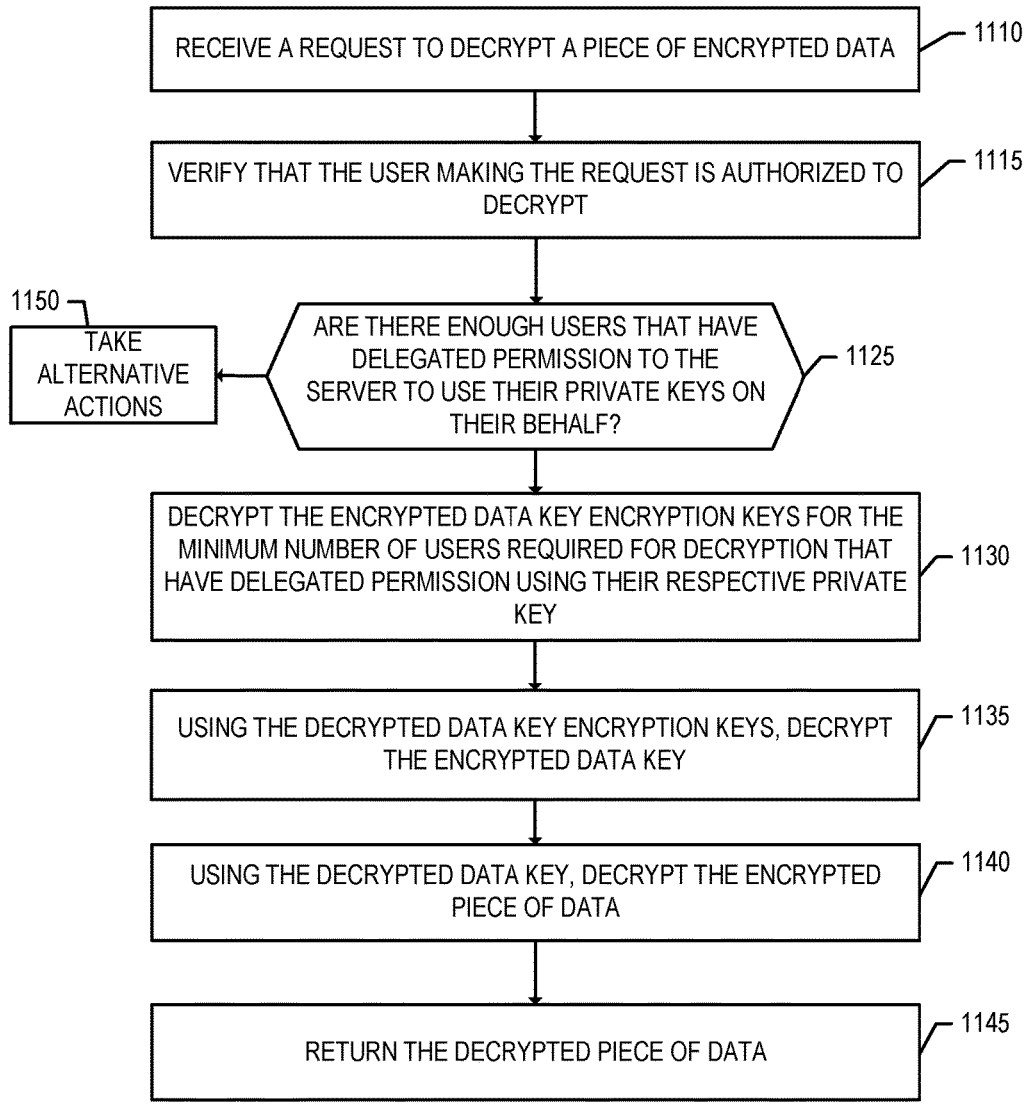
FIG. 11 is a flow diagram that illustrates exemplary operations for decrypting data according to one embodiment.

The decryption module 220 is described in more detail with respect to FIG. 10. FIG. 11 is a flow diagram that illustrates exemplary operations for decrypting data according to embodiments described herein. The operations of FIG. 11 will be described with respect to the embodiments of FIG. 10; however it should be understood that the operations described with respect to FIG. 11 can be performed by embodiments other than those described with reference to FIG. 10 and the embodiments described with reference to FIG. 10 can perform operations different than those described with reference to FIG. 11.

At operation 1110, the decryption module 220 receives the decryption request 1030 that includes the piece of encrypted data to decrypt. The decryption request 1030 may also include the key store for the encrypted data (e.g., the list of users that are authorized to participate in the decryption; the minimum number of users needed for decryption; the encrypted data keys for each unique combination; the encrypted data KEKs of the users).

In one embodiment, only registered users are allowed to decrypt data and/or only registered users with certain status (e.g., such as administrators). In such an embodiment, the decryption request 1030 may only be processed after determining that the user requesting decryption is allowed to decrypt the data. For example, the request validation module 1015 may verify 1035 the username/password of the requestor and/or access a list of users that are authorized for decryption (e.g., an administrator list). Thus, at operation 1115, the decryption module 220 verifies that the user making the request is authorized to decrypt the piece of data. If the user is not authorized to decrypt, then the operations end. Assuming that the user is authorized to decrypt the data, then flow moves to operation 1125. After the request is validated, then the decryption module 220 uses the decryption algorithm 1020 to decrypt the data. For example, the decryption algorithm uses the private keys of the delegated users to decrypt the encrypted data key encryption keys at operation 1040 and uses the decrypted data key encryption keys to decrypt the data key used to encrypt the data and uses the decrypted data key to decrypt the encrypted data at operation 1045. The decrypted data is then returned to the requester at operation 1050.

At operation 1125, the decryption module 220 determines whether there are enough users (at least to the minimum number of users required as specified in the key store) that have delegated permission to the server to use their private keys on their behalf. For example, the decryption module 220 accesses the delegation structure 240 to determine whether a combination of the minimum number of the specific users as specified in the key store have delegated their private keys. If there are not enough users that have delegated permission to the server to use their private keys, then flow moves to operation 1150 where alternative actions are taken. For example, the encryption and decryption server 110 may deny the decryption request and/or notify or request those users that have not delegated permission to use their private keys to delegate their keys. If there are enough users that have delegated permission to the server to use their private keys, then flow moves to operation 1130.

At operation 1130, the decryption module 220 decrypts, for each of the minimum number of users required for decryption that have delegated permission to use their private keys, the encrypted data key encryption key for that user using that user's respective private key. For example, if the key store indicates that two of the users 1, 2, and 3 are needed to decrypt the data and users 1 and 3 have delegated use of their respective private keys, the decryption module 220 uses those respective private keys to decrypt the encrypted data key encryption keys (also stored in the key store) for users 1 and 3 respectively. Flow then moves to operation 1135 and the decryption module 220 uses the decrypted data key encryption keys to decrypt the encrypted data key. Next, at operation 1140, the decryption module 220 uses the decrypted data key to decrypt the encrypted piece of data. Then, at operation 1145, the decryption module 220 returns the decrypted piece of data to the requestor.

Figure 12:
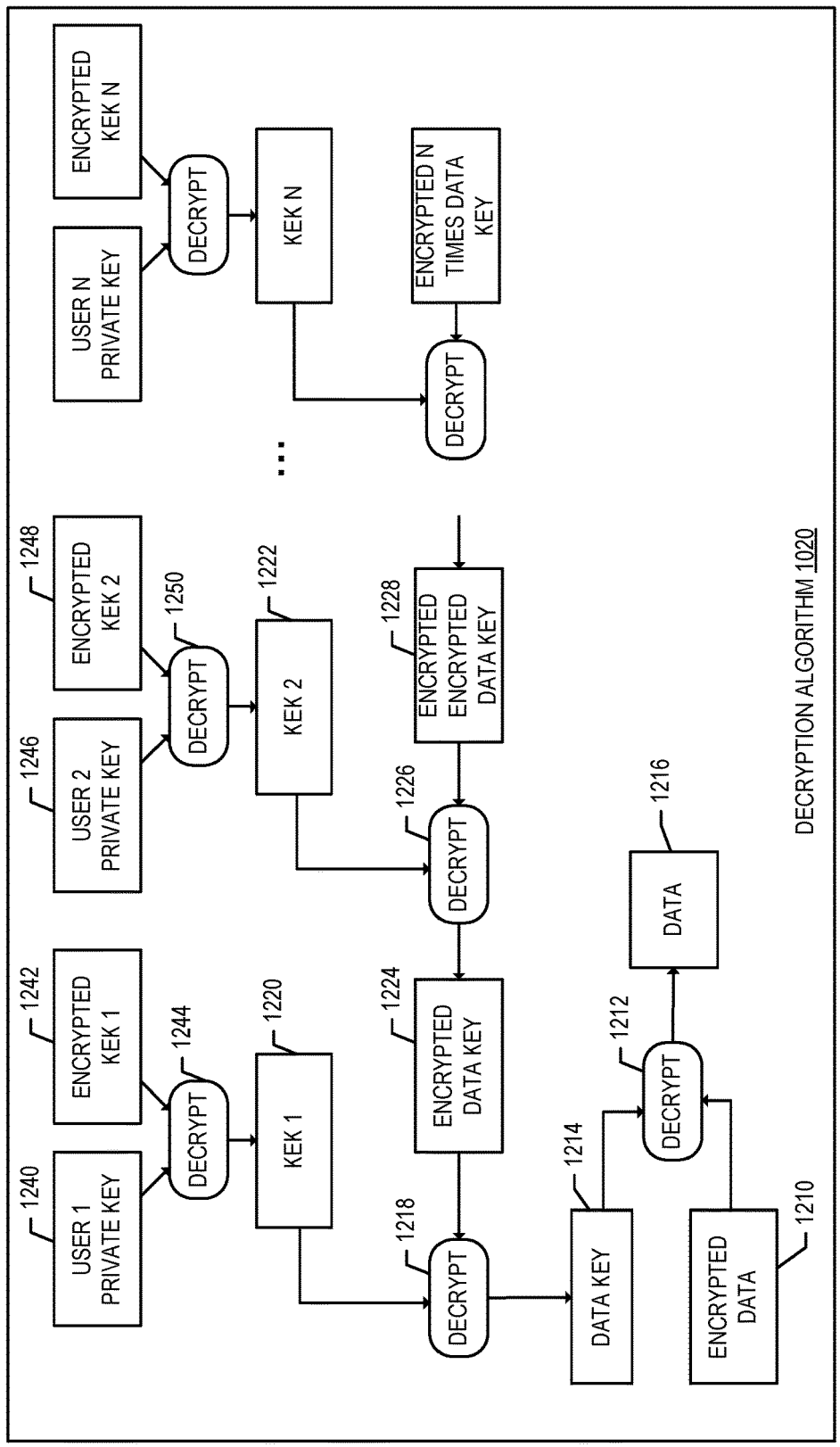
FIG. 12 illustrates an exemplary decryption algorithm for decrypting data in accordance with some embodiments.

A specific example of the decryption algorithm 1020 is shown in FIG. 12. In the example of FIG. 12, the user 1 and user 2 private key is available for decryption (e.g., the user 1 and user 2 have delegated permission to the server to use their respective private keys). The user 1 private key 1240 is used to decrypt 1244 the encrypted data KEK for user 1 1242 thereby revealing the data KEK for user 1 1220. The user 2 private key 1246 is used to decrypt 1250 the encrypted data KEK for user 2 1248 thereby revealing the data KEK for user 2 1222. Similarly, if the data has been encrypted N more times, the user N private key is used to decrypt the encrypted data KEK for user N to reveal the data KEK for user N. The data KEK for user 2 1222 is used to decrypt 1226 the double-encrypted data key 1228 thereby revealing the encrypted data key 1224. The data KEK for user 1 1220 is used to decrypt 1218 the encrypted data key 1224 thereby revealing the data key 1214. The data key 1214 is used to decrypt 1212 the encrypted data 1210 thereby revealing the decrypted data 1216.

Figure 13:
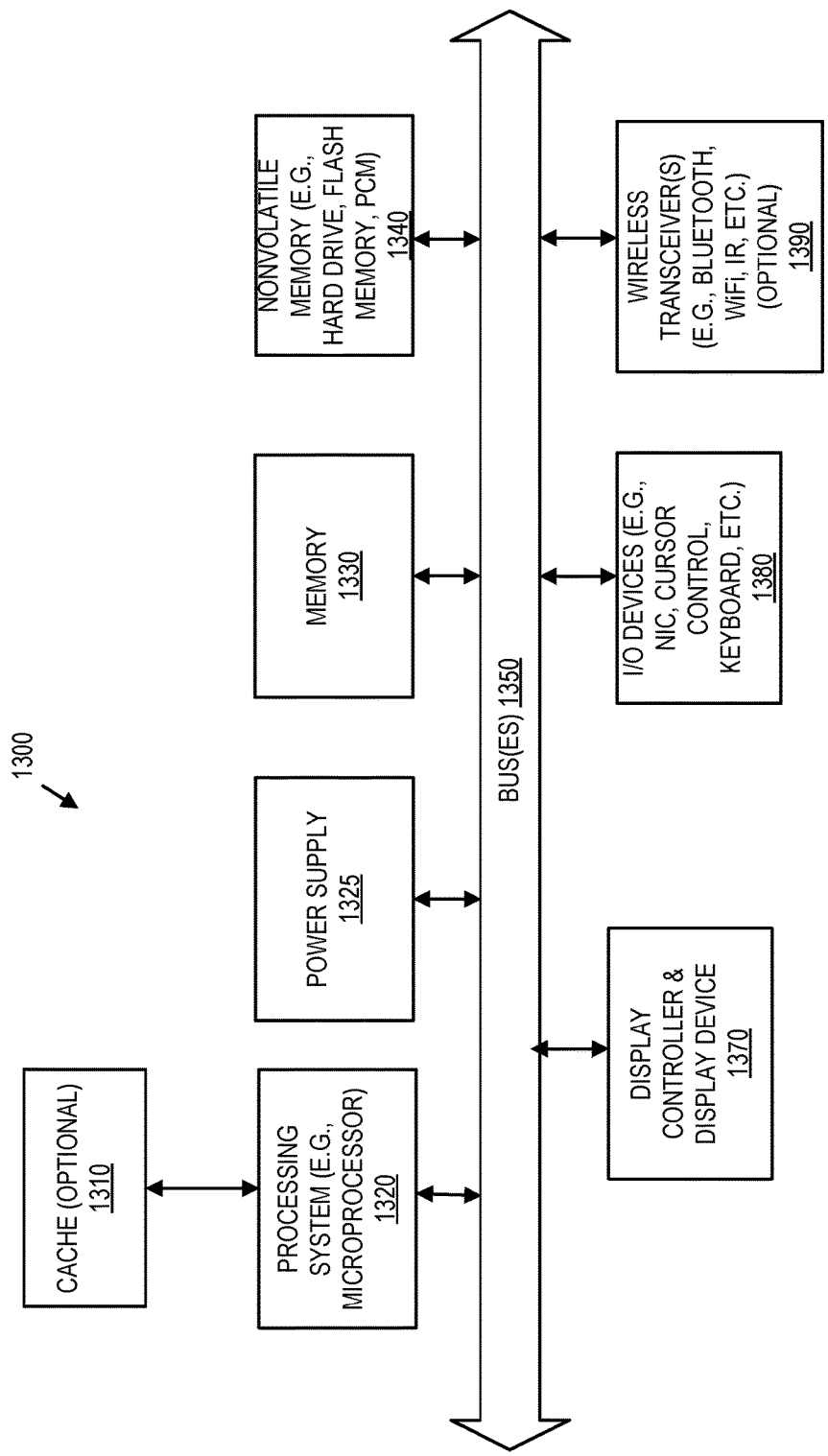
FIG. 13 illustrates an exemplary computing device that may be used in some embodiments.

As illustrated in FIG. 13, the computing device 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1350 may be connected to each other through various bridges, controllers, and/or adapters as is well known in the art. The processing system 1320 may retrieve instruction(s) from the memory 1330 and/or the nonvolatile memory 1340, and execute the instructions to perform operations described herein. The bus 1350 interconnects the above components together and also interconnects those components to the display controller & display device 1370, Input/Output devices 1380 (e.g., NIC (Network Interface Card), a cursor control (e.g., mouse, touchscreen, touchpad, etc.), a keyboard, etc.), and the wireless transceiver(s) 1390 (e.g., Bluetooth, WiFi, Infrared, etc.). One or more of the components of the computing device 1300 may be optional (e.g., the display controller and display device 1370, I/O devices 1380, the wireless transceiver(s) 1390, etc.). In one embodiment, the encryption and decryption server 110 can take the form of the computing device 1300.

While embodiments have been described with respect to an integrated encryption and decryption server, in other embodiments the functionality of the encryption may be performed on a first device and the functionality of the decryption may be performed on a second, different, device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a client device, a server, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed on a server, comprising:
receiving a request to encrypt a piece of data;
encrypting the piece of data such that no single key can decrypt the encrypted piece of data and any unique combination of a first plurality of unique keys taken a first number at a time are capable of decrypting the encrypted piece of data, wherein the first number is greater than one, wherein each one of the first plurality of unique keys is tied to account credentials of a particular user of a plurality of users respectively, and wherein the first number is less than or equal to the first plurality;
returning the encrypted piece of data;
receiving, at the server, account credentials of at least a second number of the plurality of users equivalent to the first number;
receiving, at the server, a delegation submission from at least the second number of the plurality of users that allows use of the account credentials of the at least the second number of plurality of users respectively for a limited number of decryptions or a limited amount of time;
receiving a request to decrypt the encrypted piece of data;
decrypting, for each particular one of at least the second number of the plurality of users equivalent to the first number, the one of the first plurality of unique keys that correspond to that particular one of the at least the second number of the plurality of users;
decrypting the encrypted piece of data using the decrypted ones of the first plurality of unique keys; and
returning the decrypted piece of data.

2. The method of claim 1, wherein the request to encrypt the piece of data indicates the following:
the piece of data to encrypt;
a list of a plurality of users that are associated with the first plurality of unique keys; and
a minimum number of the first plurality of unique keys that are required to decrypt the data, wherein the minimum number is equal to the first number, and wherein the minimum number is at least two.

3. The method of claim 1, wherein the step of encrypting the piece of data includes:
encrypting the piece of data with a data key;
generating a unique encrypted data key for each unique combination of the first plurality of unique keys taken the first number at a time by performing the following for each unique combination:
encrypting the data key multiple times each of which using a different one of the plurality of unique keys, wherein the multiple times is equal to the first number;
encrypting each different one of the first plurality of unique keys with the account credentials of the corresponding particular user;
returning the encrypted piece of data, each unique encrypted data key, and each encrypted different unique keys; and
discarding the piece of data and the encrypted piece of data.

4. The method of claim 3, wherein the data key is a random symmetric key.

5. An apparatus for encrypting and decrypting data, comprising:
a set of one or more processors;
a non-transitory machine-readable storage medium that stores instructions that, when executed by the set of processors, generate the following:
an encryption module that is configured to encrypt a piece of data such that no single key can decrypt the encrypted piece of data and any unique combination of a first plurality of unique keys taken a first number at a time are capable of decrypting the encrypted piece of data, wherein the first number is greater than one, wherein each particular one of the first plurality of unique keys is tied to account credentials of a particular user of a plurality of users respectively, and wherein the first number is less than or equal to the first plurality;
a decryption module that is configured to decrypt the piece of data when there is access to at least one combination of the first plurality of unique keys taken the second plurality at a time; and
a delegation module that is configured to permit each of the different users to delegate use of their account credentials respectively for decrypting data for a limited number of decryptions or for a limited amount of time.

6. The apparatus of claim 5, wherein the encryption module is configured to encrypt the piece of data through performance of the following:
   encrypt the piece of data with a data key;
   generate a unique encrypted data key for each unique combination of the first plurality of unique keys taken the first number at a time by performing the following for each unique combination:
      encrypt the data key multiple times each of which using a different one of the first plurality of unique keys, wherein the multiple times is equal to the first number;
      store each of the unique encrypted data keys; and
      discard the piece of data, the encrypted piece of data, and the data key.

7. The apparatus of claim 5, wherein the non-transitory machine-readable storage medium further stores instructions that, when executed by the set of processors, generate the following:
   an account creation module that is configured to:
      for each of the plurality of users,
         create an account,
         create a key pair including a public key and a private key,
         encrypt the private key using a password key derived from a password, and
         cause the encrypted private key to be stored in association with the account for that user.

8. A non-transitory machine-readable storage medium that stores instructions that, when executed by a set of one or more processors of a server, cause the server to perform operations, comprising:
   receiving a request to encrypt a piece of data;
   encrypting the piece of data such that no single key can decrypt the encrypted piece of data and any unique combination of a first plurality of unique keys taken a first number at a time are capable of decrypting the encrypted piece of data, wherein the first number is greater than one, wherein each one of the first plurality of unique keys is tied to account credentials of a particular user of a plurality of users respectively, and wherein the first number is less than or equal to the first plurality;
   returning the encrypted piece of data;
   receiving, at the server, account credentials of at least a second number of the plurality of users equivalent to the first number;
   receiving, at the server, a delegation submission from at least the second number of the plurality of users that allows use of the account credentials of the at least the second number of plurality of users respectively for a limited number of decryptions or a limited amount of time;
   receiving a request to decrypt the encrypted piece of data;
   decrypting, for each particular one of at least the second number of the plurality of users equivalent to the first number, the one of the first plurality of unique keys that correspond to that particular one of the at least the second number of the plurality of users;
   decrypting the encrypted piece of data using the decrypted ones of the first plurality of unique keys; and
   returning the decrypted piece of data.

9. The non-transitory machine-readable storage medium of claim 8, wherein the request to encrypt the piece of data indicates the following:
   the piece of data to encrypt;
   a list of a plurality of users that are associated with the first plurality of unique keys; and
   a minimum number of the first plurality of unique keys that are required to decrypt the data, wherein the minimum number is equal to the first number, and wherein the minimum number is at least two.

10. The non-transitory machine-readable storage medium of claim 8, wherein the step of encrypting the piece of data includes:
   encrypting the piece of data with a data key;
   generating a unique encrypted data key for each unique combination of the first plurality of unique keys taken the first number at a time by performing the following for each unique combination:
      encrypting the data key multiple times each of which using a different one of the plurality of unique keys, wherein the multiple times is equal to the first number;
   encrypting each different one of the first plurality of unique keys with the account credentials of the corresponding particular user;
   returning the encrypted piece of data, each unique encrypted data key, and each encrypted different unique keys; and
   discarding the piece of data and the encrypted piece of data.

11. The non-transitory machine-readable storage medium of claim 10, wherein the data key is a random symmetric key.

* * * * *